(12) United States Patent  
Matsushita et al.

(10) Patent No.: US 7,377,870 B2  
(45) Date of Patent: May 27, 2008

(54) PLANETARY GEAR LUBRICATION UNIT

(75) Inventors: Junji Matsushita, Anjo (JP); Satoru Wakuta, Anjo (JP); Yoshio Kintou, Anjo (JP); Seigo Kano, Anjo (JP); Kazuhisa Ozaki, Anjo (JP); Kinya Yoshii, Toyota (JP); Masatoshi Adachi, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 271 days.

(21) Appl. No.: 11/377,416

(22) Filed: Mar. 17, 2006

(65) Prior Publication Data

US 2006/0223665 A1    Oct. 5, 2006

(30) Foreign Application Priority Data

Mar. 22, 2005    (JP)    ............................. 2005-081754

(51) Int. Cl.  
*F16H 57/04*    (2006.01)

(52) U.S. Cl. .................................................... 475/159

(58) Field of Classification Search ................. 475/159  
See application file for complete search history.

(56) References Cited

U.S. PATENT DOCUMENTS 5,591,099 A * 1/1997 Tsukamoto et al. ......... 475/318
5,910,063 A * 6/1999 Kato ............................ 475/159
6,602,158 B2 * 8/2003 Wildeshaus ................. 475/159
6,817,962 B2 * 11/2004 Tanikawa .................... 475/159
7,252,615 B2 * 8/2007 Kempf ........................ 475/159
2004/0084233 A1    5/2004 Wakuta et al.

FOREIGN PATENT DOCUMENTS

| JP | U-2-84053    | 6/1990  |
|----|--------------|---------|
| JP | A-3-9145     | 1/1991  |
| JP | U-4-126055   | 11/1992 |
| JP | A-10-68461   | 3/1998  |
| JP | A-2001-153212| 6/2001  |
| JP | A 2004-066898| 3/2004  |
| JP | A-2004-353780| 12/2004 |

* cited by examiner

*Primary Examiner*—Dirk Wright  
(74) *Attorney, Agent, or Firm*—Oliff & Berridge, PLC

(57) ABSTRACT

A planetary gear lubrication unit includes a planetary gear unit having a sun gear and a carrier that has a plurality of pinion shafts, wherein each of the plurality of pinion shafts rotatably supports a pinion, a plurality of side plates that support the plurality of pinion shafts, and a rotating shaft arranged in a center portion of the planetary gear unit, in which lubrication oil supplied from the rotating shaft is led to a portion of the pinion shafts that support the pinions.

20 Claims, 4 Drawing Sheets

FIG. 1A
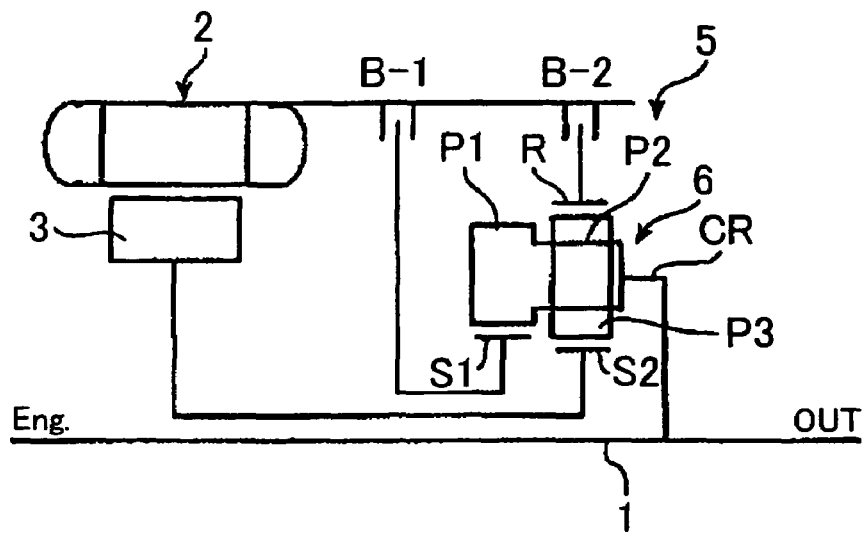
FIG. 1B
BRAKE APPLICATION CHART
|    | B-1 | B-2 |
|----|-----|-----|
| Lo |     | O   |
| Hi | O   |     |
FIG. 1C
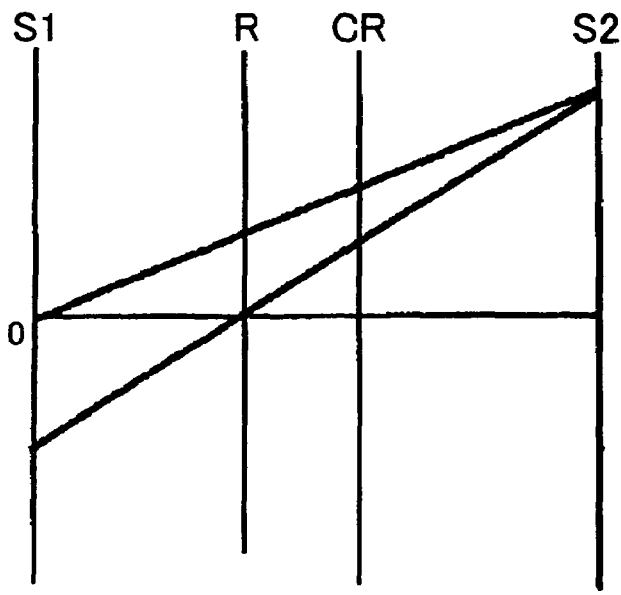

PLANETARY GEAR LUBRICATION UNIT

CROSS-REFERENCE TO RELATED APPLICATION

The disclosure of Japanese Patent Application No. 2005-081754, filed on Mar. 22, 2005, including the specification, drawings and abstract is incorporated herein by reference in its entirety.

BACKGROUND

The present invention relates to a planetary gear lubrication unit.

There exists a lubrication unit in a planetary gear unit of a transmission arranged in the output path of a drive motor of a hybrid drive system in which a receiver is provided in a carrier of the planetary gear (see FIG. 7 of Japanese Patent Application Publication No. JP-A-2004-66898).

The receiver is provided protruding toward a carrier side and is open radially inward. Lubrication oil from an oil hole in a rotating shaft is dispersed via thrust bearings by centrifugal force generated as the rotating shaft rotates. The dispersed lubrication oil is caught by the receiver which protrudes in the axial direction and is open on the inner radial side. The lubrication oil in the receiver then flows through oil holes in the pinion shaft and lubricates a bearing that supports the pinion.

SUMMARY

However, because the foregoing lubrication unit catches the lubrication oil dispersed as the rotating shaft rotates with the receiver, the supply of lubrication oil is inefficient. More specifically, when lubrication oil is dispersed via the thrust bearings that sandwich the ring gear support flange, a high percentage of the lubrication oil is dispersed in a direction away from the receiver. As a result, a sufficient amount of lubrication oil is unable to be supplied to the pinion shaft. Furthermore, when the lubrication unit is applied to a transmission of a drive motor of a hybrid drive system, a lot of lubrication oil is not able to be supplied because the hybrid drive system generates oil pressure with an electric oil pump. Supplying lubrication oil in this state with the receiver which has low supply efficiency thus tends to result in poor lubrication of the pinion shaft.

Also, the foregoing lubrication unit requires space in the axial direction for arranging the receiver which protrudes a predetermined amount toward the carrier side. This makes it difficult to make the planetary gear, and thus the transmission using the planetary gear, and the hybrid drive system, more compact, especially in the axial direction.

The present invention thus aims to provide, among other things, a planetary gear lubrication unit that solves the foregoing problems by having a structure which leads lubrication oil from a rotating shaft to a pinion shaft without lubrication oil escaping.

A planetary gear lubrication unit according to an exemplary aspect of the invention includes a planetary gear unit having a sun gear and a carrier that has a plurality of pinion shafts, wherein each of the plurality of pinion shafts rotatably supports a pinion, a plurality of side plates that support the plurality of pinion shafts, and a rotating shaft arranged in a center portion of the planetary gear unit, in which lubrication oil supplied from the rotating shaft is led to a portion of the pinion shafts that support the pinions. A first side plate of the plurality of side plates that supports the pinion shafts has an annular groove in an inner peripheral surface and a communication hole that extends in a radial direction from a bottom portion of the annular groove and is connected to an oil hole of each pinion shaft. A thrust bearing is interposed between a flange integrally connected with the first side plate, and the sun gear. The thrust bearing includes a race that has a rising portion that extends in the radial direction on a sun gear side. The planetary gear lubrication unit is structured such that lubrication oil from the rotating shaft is led between the rising portion of the race and the flange to the annular groove, and then led, via the communication hole, to the oil hole of each pinion shaft.

BRIEF DESCRIPTION OF THE DRAWINGS

Various aspects of the invention will be described with reference to the drawings, wherein:

FIG. 1 is a view showing a transmission to which the present invention can be applied, with FIG. 1A being a schematic diagram, FIG. 1B being a brake application chart, and FIG. 1C being a velocity diagram;

DETAILED DESCRIPTION OF EMBODIMENTS

Figure 2:
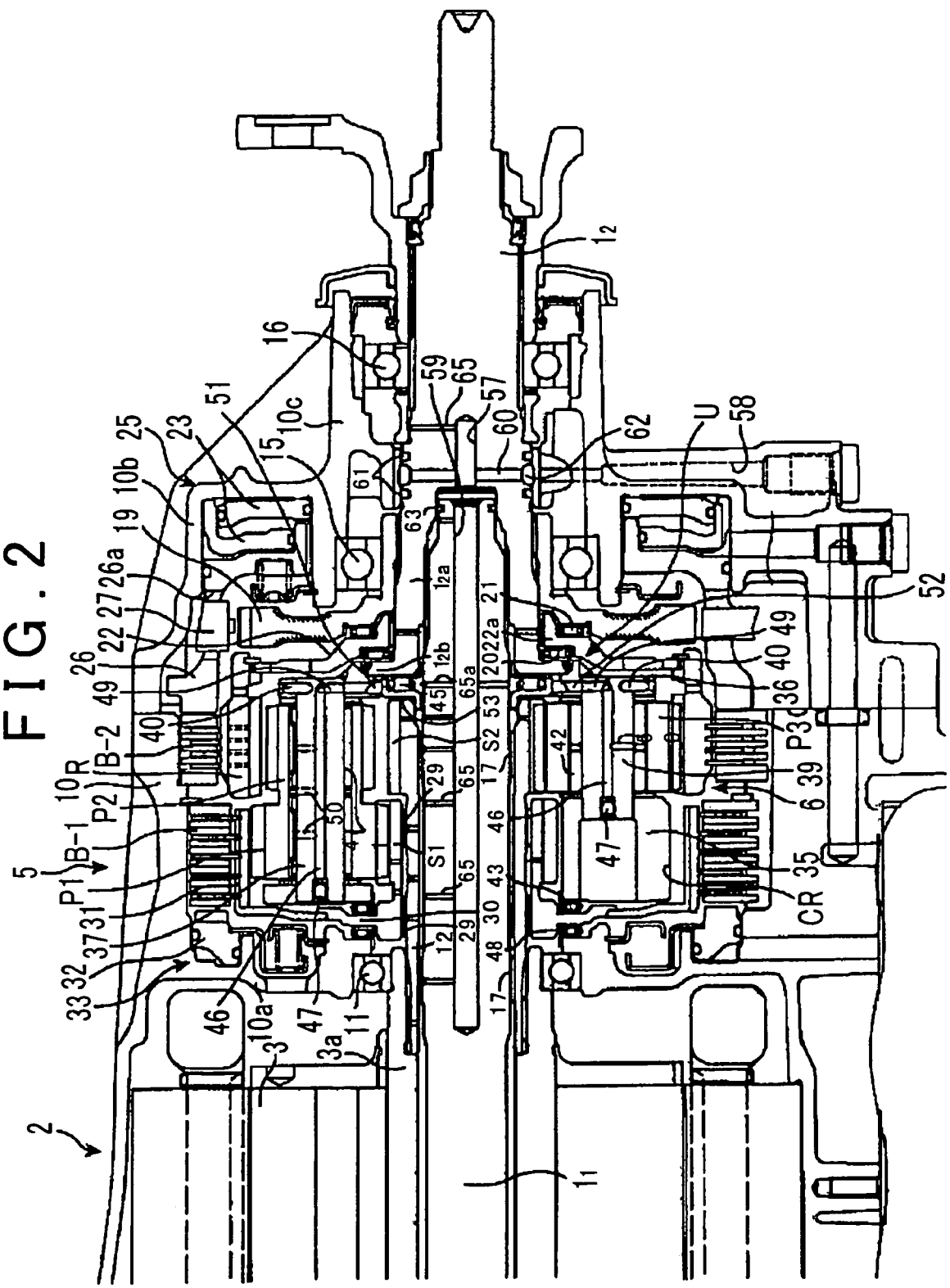
FIG. 2 is a sectional view of the transmission.

Hereinafter an example embodiment of the present invention will be described with reference to the accompanying drawings. FIG. 1 is a view showing a planetary gear unit to which the lubrication unit can be applied. The planetary gear unit is for a transmission for an output from a drive motor of a hybrid drive system. The hybrid drive system includes a power distributing planetary gear unit, not shown. Output from an internal combustion engine is transmitted to a first element (such as a carrier) of the planetary gear unit. A control motor is connected to a second element (such as a sun gear), and an output shaft is connected to a third element (such as a ring gear). Output from the internal combustion engine is shifted steplessly by controlling the control motor, and then output to an output shaft 1. Also, a rotor 3 of a drive motor 2 is connected via a transmission 5 to the output shaft 1 (see Japanese Patent Application Publication No. JP-A-2004-66898 for more details).

The transmission 5 includes a so-called Ravigneaux type planetary gear unit 6, which has two sun gears, two sets of planetary pinion gears: short and long, which are contained in a single planet carrier, and one ring gear. The long pinion includes two pinions P1 and P2 which have a different number of teeth. That is, a common carrier CR supports the long pinion and a short pinion P3. The large diameter pinion P1 of the long pinion is in mesh with a first sun gear S1 and the short pinion P3 is in mesh with the small diameter gear P2 of the long pinion, a second sun gear S2, and a ring gear R. The second sun gear S2 is connected to the rotor 3 of the drive motor 2, the carrier CR is connected to the output shaft 1, the first sun gear S1 is connected to a first brake B-1, and the ring gear R is connected to a second brake B-2.

The transmission 5 operates as illustrated in the brake application chart in FIG. 1B and the velocity diagram in FIG. 1C. That is, in a Low mode (i.e., in low speed), the first brake B-1 is released and the second brake B-2 is applied. As a result, the ring gear R is held stationary so as the second sun gear S2 is rotated by the drive motor 2, the carrier CR rotates at a greatly reduced speed while the first sun gear S1 rotates idly backwards. This rotation of the carrier CR is output to the output shaft 1. In a High mode (i.e., in high speed), the first brake B-1 is applied and the second brake B-2 is released. As a result, the first sun gear S1 is held stationary, so as the second sun gear S2 is rotated by the drive motor 2, the carrier CR rotates at a slightly reduced speed while the ring gear R rotates idly. This rotation of the carrier CR is output to the output shaft 1.

Figure 3:
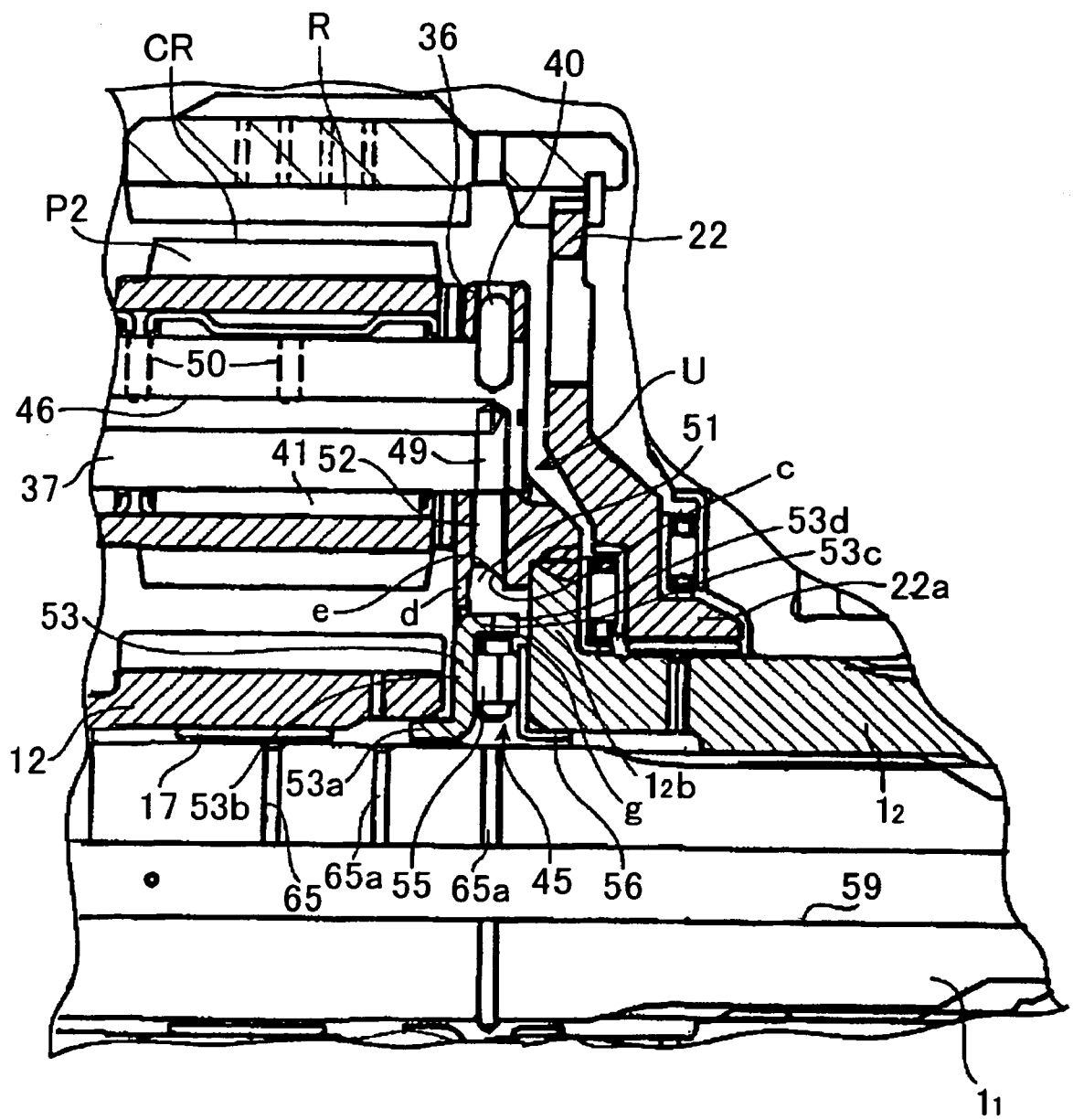
FIG. 3 is an enlarged view of the main portion of the sectional view that shows a lubrication unit according to the present invention.

FIG. 2 is a sectional view of the transmission 5. FIG. 3 is an enlarged sectional view of the main portion of that drawing that shows a lubrication unit. The drive motor 2 and the transmission 5 are housed adjacent to one another in a case 10 of the hybrid drive system. A rotor shaft 3a of the drive motor 2 is rotatably supported via a bearing 11 by a partition 10a of the case 10. A sleeve shaft 12 is integrally connected by splines to the rotor shaft 3a. A front output shaft $1_1$ from the power distributing planetary gear extends through a hollow portion of the sleeve shaft 12 and the rotor shaft 3a which are both hollow shafts. An output shaft $1_2$ is integrally connected by splines to the rear portion of the front output shaft $1_1$. These output shafts $1_1$ and $1_2$ form rotating shafts that are arranged in the center of the planetary gear unit. The output shaft $1_2$ is rotatably supported via bearings 15 and 16 by a boss portion 10c of a rear wall 10b of the case 10. Also, a plurality of bushes 17 and 17 are interposed between the front output shaft $1_1$ and the sleeve shaft 12.

A parking gear 19 for detecting output rotation speed is spline-engaged with the outer peripheral surface of an insert portion $1_2a$ where the front output shaft $1_1$ inserts into the output shaft $1_2$, between the bearing 15 and the insert portion $1_2a$. The front end portion of the output shaft insert portion $1_2a$ is a flange $1_2b$. A ring gear support plate 22 is arranged, via thrust bearings 20 and 21 on the left and right, between the flange $1_2b$ and the parking gear 19. The ring gear R is supported on the outer periphery of the support plate 22 by spline engagement so as not to slip off. The inner periphery of the support plate 22 is boss-shaped and the support plate 22 is rotatably supported by the output shaft 12 with a boss portion 22a. Accordingly, the ring gear R is stably supported. Supporting the ring gear R with high precision reduces the noise produced by gear mesh in the planetary gear unit 6.

The second brake B-2 that includes a plurality of discs and plates (i.e., inner friction plates and outer friction plates) is interposed between, and spline-engaged with, outer splines formed on the outer peripheral surface of the ring gear R and inner splines formed on the inner peripheral surface of the case 10. The second brake B-2 and the ring gear R are arranged overlapping in the axial direction. A hydraulic actuator 25 formed of a double piston 23 is provided on the inside of the case rear wall 10b. A pressure apply portion 26 of the actuator 25 extends in the axial direction and is guided so as not to rotate in the case 15. The pressure apply portion 26 faces one side surface of the second brake B-2. A plurality of holes 26a for a rotation speed detecting sensor 27 are formed in this pressure apply portion 26.

Further, the transmission 5 is arranged between the partition 10a and the rear wall 10b of the case 10. This transmission 5 includes the Ravigneaux type planetary gear unit 6 and the first and second brakes B-1 and B-2, as described above. The first sun gear S1 of the planetary gear unit 6 is rotatably fitted to the outer periphery of the sleeve shaft 12 via bushes 29 and 29. The front end side of the first sun gear S1 is a flange 30. A flange portion of a drum 31 of the first brake B-1 is integrally fixed to the flange 30 by welding. The first brake B-1 which includes a plurality of discs and plates (i.e., inner friction plates and outer friction plates) is interposed between, and spline-engaged with, outer splines formed on the outer peripheral surface of the drum 31 and inner splines formed on the inner peripheral surface of the case 10. A hydraulic actuator 33 formed of a single piston 32 is provided on one side surface of the case partition 10a. A pressure apply portion of the piston 32 faces one side surface of the first brake B-1. Also, the second sun gear S2 is formed on the outer periphery of the rear end portion of the sleeve shaft 12.

The carrier CR of the planetary gear unit 6 is disposed at a portion between the flange 30 of the first sun gear S1 and the ring gear support plate 22. The carrier CR is formed of carrier main body 35 and a carrier cover 36 which are integrally connected. A long pinion shaft 37 and a short pinion shaft 39 are supported in alternating fashion across the main body 35 and the cover 36, which are examples of side plates. There are three of each of these shafts 37 and 39, making a total of six, arranged in the circumferential direction. All of these shafts are prevented from rotating on the carrier CR by pins 40. The long pinion, in which the two pinions P1 and P2 that have a different number of teeth are integrally formed, is rotatably supported on each shaft 37 via needle bearings 41 and 41, while the single short pinion P3 is rotatably supported via a needle bearing 42 on each shaft 39.

A thrust bearing 48 is interposed between the left side surface of the sun gear flange 30 and the side surface of the case partition 10a. Another thrust bearing 43 is interposed between the right side surface of the sun gear flange 30 and the side surface of the carrier main body 35. These bearings 48 and 43 and the thrust bearings 20 and 21 position, and stably support, the carrier CR, the first sun gear S1, and the ring gear R in the axial direction with respect to the case 10. Also, a thrust bearing 45 is interposed between the rear end surface of the sleeve shaft 12 and the front end surface of the output shaft $1_2$, which positions the sleeve shaft 12 on which the second sun gear S2 is formed in the axial direction. These thrust bearings stably support the entire planetary gear unit 6 in the axial direction with respect to the case 10 such that a highly precise mesh between the gears is maintained.

Oil holes 46 and 46 are formed in the center portion from the front end side in each of the pinion shafts 37 and 39. The front end portion of each oil hole 46 is plugged with a plug 47 and 47. Further, the rear end portion of each oil hole 46 is connected to oil holes 49 and 49 in the radial direction. Radial oil holes 50 are also formed as appropriate in each oil hole 46. Meanwhile, the carrier cover 36 is integrally connected, at an inner peripheral portion thereof, to the flange $1_2b$ of the output shaft $1_2$ by welding.

An annular groove 51 formed by an inclined surface c which slants in the outer radial direction away from the flange $1_2b$ is formed in the inner peripheral surface of the carrier cover 36 adjacent to the flange $1_2b$. A flange portion d which protrudes radially inward is formed on the front end side, in the axial direction, of the inner peripheral surface of the carrier cover 36. That is, the annular groove 51 gradually becomes deeper, in the outer radial direction, from the flange $1_2b$ by the inclined surface c and rises substantially perpendicular from a bottom portion e of the annular groove 51 by the flange portion d. The flange portion d is higher than the portion where the inclined surface c begins, i.e., it protrudes radially inward, and an oil pool is formed between the flange portion d and the flange $1_2b$. Moreover, a communicating hole 52 which extends radially so as to provide communication between the bottom portion e of the annular groove 51 and the radial oil holes 49 of the pinion shafts 37 and 39, is formed in the carrier cover 36.

The thrust bearing 45 positioned on the inner radial side of the annular groove 51 includes a race 53 which has a Z-shaped cross section, and a plurality of rollers 55. An inner radial portion 53a of the race 53 is fitted to the inner peripheral surface of the rear end of the sleeve shaft 12. The rollers 55 contact a rising portion 53b of the race 53 and also contact the front end side surface of the flange $1_2b$ via a receiving plate 56. The outer radial end portion of the rollers 55 is retained by an outer radial portion 53c of the race. The outer radial end of the rising portion 53b of the race is in close proximity to the inner radial end of the flange portion d of the carrier cover 36. The bearing 45 is arranged such that it overlaps in the axial direction with the annular groove 51 that forms the oil pool. Also, cutout portions 53d are formed at predetermined intervals in the outer radial portion 53c of the race 53.

Meanwhile, a lubrication oil passage 58 is formed in the rear wall 10b of the case. Lubrication oil is supplied to the oil passage 58 according to a lubrication oil pressure determined by an electric oil pump. Also, oil holes 57 and 59 are formed in the center portions of both the output shaft $1_2$ and the output shaft $1_1$. An oil hole 60 in the radial direction which is connected to the oil hole 57 is formed in the output shaft $1_2$. An annular groove 62 which is sealed at both end portions in the axial direction by seal rings 61 and 61 is formed in the outer peripheral surface of the output shaft $1_2$ where the oil hole 60 opens. This annular groove 62 is connected to the lubrication oil passage 58. Also, both center oil holes 57 and 59 are open facing one another and are connected by a seal ring 63 of the insert portion. Further, radial holes 65 and 65 are formed as appropriate in the center oil holes 57 and 59 to supply lubrication oil to portions requiring lubrication. Of those radial holes 65, one radial hole 65a opens to the thrust bearing 45 portion.

Together these oil passages, the thrust bearing 45, and the annular groove 51 forming the oil pool, and the like form the lubrication unit U according to the present invention.

Next, the operation of the foregoing lubrication unit U will be described. Lubrication oil is supplied by the electric pump to the thrust bearing 45 via the lubrication oil passage 58, the annular groove 62, the oil holes 60, 65, and 59, and the radial hole 65a. When the vehicle is running, the output shafts $1_1$ and $1_2$ rotate, and while the drive motor 2 of the transmission 5 is operating and generating output, the sleeve shaft 12 which is integrated with the rotor shaft 3a rotates regardless of whether the drive system is in the Low mode or the High mode. As a result, the race 53 of the thrust bearing 45 rotates together with the sleeve shaft 12.

Accordingly, a centrifugal force produced by the rotation of the output shaft $1_1$ and the thrust bearing 45 acts on the lubrication oil flowing out of the radial hole 65a. As a result of the centrifugal force, almost all of the lubrication oil is led between the race 53 of the thrust bearing 45 and the output shaft flange $1_2b$. As the lubrication oil passes between the race 53 and the flange $1_2b$, almost all of that lubrication oil flows radially outward by the centrifugal force produced by the rotating thrust bearing 45 and output shaft flange $1_2b$, and as it does so, the lubrication oil lubricates the rollers 55.

The centrifugal force causes the lubrication oil to pass from a gap g between the outer radial portion 53c of the race 53 and the flange $1_2b$ through the cutout portions 53d formed at predetermined intervals, to the annular groove 51 which forms the oil pool. Moreover, the annular groove 51 is formed in the carrier cover 36 which rotates together with the output shaft $1_2$. The centrifugal force then acts on the lubrication oil in the annular groove 51, causing it to flow from the bottom portion e of the annular groove 51 to the oil hole 52, and from there, on to the radial oil hole 49, the center oil hole 46, and the radial oil holes 50 in each of the pinion shaft 37 and 39, until it is ultimately supplied to the needle bearings 41 and 42.

At this time, a plurality (such as eight) of the pinion shafts 37 and 39 are arranged at predetermined intervals in the circumferential direction. Accordingly, a plurality of communication holes 52 in the carrier cover 36 that are connected to the oil holes 49 in those shafts are also arranged at predetermined intervals. Lubrication oil stored in the annular groove 51, which serves as an oil pool, is drawn up from the communication holes 52 that are arranged at predetermined intervals. Meanwhile, lubrication oil that passes through the gap g along the flange $1_2b$ is led, distributed substantially evenly along the entire periphery of the annular groove 51, along the inclined surface c toward the bottom portion e of the annular groove, while the lubrication oil that passes through the cutout portions 53d is supplied to the annular groove 51 concentrated in relatively large amounts. The carrier CR, which is connected to the output shaft $1_2$, and the thrust bearing 45, which is fitted to the sleeve shaft 12 with the second sun gear S2, rotates at different speeds, which causes the lubrication oil supplied in concentration from the cutout portions 53d to be distributed substantially evenly along the entire periphery of the annular groove 51.

The lubrication oil that was substantially evenly supplied to the annular groove 51 clings to the annular groove 51 by the centrifugal force and forms an oil pool. The volume of this oil pool is large because of the relatively high flange portion d, the tip end (i.e., the inner radial end) of which extends to near the outer radial end of the race 53. Thus, even if there is a concentration (an uneven distribution) at locations where lubrication oil flows out as it is drawn into the communication holes 52 arranged at predetermined intervals, the combination of the smooth supply of lubrication oil from the gap g by the inclined surface c and the distribution of the lubrication oil from the cutout portions 53d by the relative rotation results in almost no lubrication oil spilling over the flange portion d. Thus, almost all of the supplied lubrication oil that passes between the race 53 and the flange $1_2b$ is supplied to the oil holes 46 in the pinion shafts 37 and 39 through the annular groove 51 and the communication hole 51. As a result, smooth rotation of the pinions P1, P2, and P3 due to sufficient lubrication, as well as smooth meshing of those pinions, is maintained over an extended period of time.

Further, in an engine running mode in which the drive motor 2 is stopped and the output shaft $1_2$ is driven only by the internal combustion engine, the transmission 5 does not operate so there is no need for much lubrication oil. The carrier CR which is integrated with the output shaft $1_2$, however, rotates idly. In this state as well, centrifugal force generated by the rotation of the output shafts $1_1$ and $1_2$ forces the lubrication oil from the oil hole 65a, between the race 53 of the bearing 45 and the flange $1_2b$, and to the annular groove 51 of the rotating carrier, where it is then supplied to the oil holes 46 in the pinion shafts.

Moreover, the thrust bearing 45 and the annular groove 51 and the like which form the lubrication unit U are formed overlapping in the axial direction in a narrow space in the axial direction within the width of the carrier cover 36. Accordingly, compared with the structure of the related art which requires a receiver that protrudes in the axial direction, the lubrication unit U according to the present invention is able to be shorter in the axial direction. The axial space that is gained as a result can be used to form the boss portion 22a on the ring gear support plate 22, thereby increasing the precision with which the ring gear R is supported so that the gear noise can be reduced.

Figure 4A:
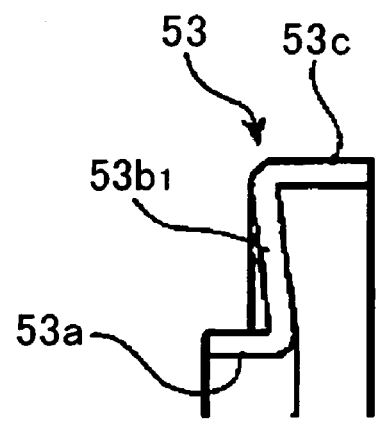
FIG. 4 is a view showing other example embodiments of a thrust bearing race, with FIG. 4A and FIG. 4B being different example embodiments.
Figure 4B:
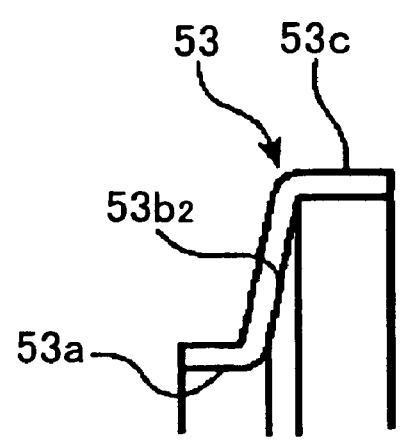

The race 53 of the thrust bearing 45 is not limited to having the rising portion 53b that is perpendicular as shown in FIG. 3. Alternatively, the race 53 may be a convex tapered race in which a rising portion $53b_1$ becomes convex in the roller direction, as shown in FIG. 4A, or a concave tapered race in which a rising portion $53b_2$ becomes concave, as shown in FIG. 4B. Moreover, the race 53 may have another shape, such as one in which the outer radial portion 53c includes only the portion necessary to support the roller. Also, the lubrication unit is not limited to a transmission for changing the output rotation speed of a drive motor of a hybrid drive system, as described above, but may of course be also be applied to another transmission and even to a planetary gear unit other than a transmission planetary gear.

A planetary gear lubrication unit according to an exemplary aspect of the invention is structured such that lubrication oil supplied from a rotating shaft to a thrust bearing by centrifugal force is lead to a race of the thrust bearing and a flange integrated with a carrier. Almost all of that lubrication oil is then supplied to an annular groove which serves as an oil pool. Centrifugal force generated by the rotation of the carrier causes the lubrication oil in the oil pool to flow to a pinion support portion via a communication hole and an oil hole in the pinion shaft such that the pinion is lubricated by a sufficient amount of lubrication oil. As a result, gear mesh performance of the pinion is able to be maintained over an extended period of time.

According to another exemplary aspect of the invention, the lubrication unit for the pinion can be made compact in the axial direction so the planetary gear can also be made compact, especially in the axial direction.

According to another exemplary aspect of the invention, when the output shaft rotates, the flange and the carrier also rotate. Accordingly, centrifugal force from that rotation acts on the lubrication oil, thus enabling lubrication oil to be supplied appropriately when it needs to be supplied to the pinion.

According to another exemplary aspect of the invention, by having the inner radial portion of the race mesh with a sun gear, which serves as the input portion of the planetary gear, for example, then when the planetary gear is operating, both the race and the flange rotate so lubrication oil inside the thrust bearing can be reliably supplied to the annular groove, which serves as the oil pool, by the centrifugal force generated by that rotation. Furthermore, the lubrication oil passes through a gap between an outer radial portion of the race and the flange so all of that lubrication oil can be supplied in substantially even amounts across the entire circumference of the annular groove without any leaking to the outside.

According to another exemplary aspect of the invention, a cutout portion enables the necessary amount of lubrication oil to be supplied to the annular groove which serves as an oil pool.

According to another exemplary aspect of the invention, lubrication oil that passes through the gap between the outer radial portion of the race and the flange can be reliably and smoothly led to the bottom portion of the annular groove and then to the communication hole.

According to another exemplary aspect of the invention, a capacity sufficient for the oil pool can be ensured in the annular groove which both reduces the amount of lubrication oil that spills out of the annular groove and enables a sufficient amount of lubrication oil to be led to each communication hole, a plurality of which are arranged in the circumferential direction, without that amount ever becoming insufficient.

According to another exemplary aspect of the invention, the planetary gear is structured such that a supporting boss portion can be formed on a ring gear support plate because of the excess space in the axial direction resulting from making the lubrication unit compact in the axial direction. Forming this supporting boss portion on the ring gear support plate stabilizes the support of the ring gear which improves the precision of ring gear mesh and thus reduces gear noise. This improved precision of ring gear meshing combined with the improved lubrication of the pinion, as described above, enables highly precise gear meshing in the planetary gear to be maintained over an extended period of time.

According to another exemplary aspect of the invention, the planetary gear lubrication unit is structured such that, by applying the planetary gear to a transmission of a drive motor of a hybrid drive system, the transmission is able to operate quietly with little gear noise, thus matching the quiet operation of the hybrid drive system, especially in a motor drive mode. In addition, lubrication oil of a small absolute volume due to the electric motor is able to be used highly efficiently without being wasted.

What is claimed is:

1. A planetary gear lubrication unit, comprising
   a planetary gear unit having a sun gear and a carrier that has a plurality of pinion shafts, wherein each of the plurality of pinion shafts rotatably supports a pinion;
   a plurality of side plates that support the plurality of pinion shafts; and
   a rotating shaft arranged in a center portion of the planetary gear unit, in which lubrication oil supplied from the rotating shaft is led to a portion of the pinion shafts that support the pinions, wherein:
   a first side plate of the plurality of side plates that supports the pinion shafts has an annular groove in an inner peripheral surface and a communication hole that extends in a radial direction from a bottom portion of the annular groove and is connected to an oil hole of each pinion shaft;
   a thrust bearing is interposed between a flange integrally connected with the first side plate, and the sun gear;
   the thrust bearing includes a race that has a rising portion that extends in the radial direction on a sun gear side; and
   the planetary gear lubrication unit is structured such that lubrication oil from the rotating shaft is led between the rising portion of the race and the flange to the annular groove, and then led, via the communication hole, to the oil hole of each pinion shaft.

2. The planetary gear lubrication unit according to claim 1, wherein the thrust bearing, and the annular groove and the communication hole in the first side plate are arranged to overlap in an axial direction.

3. The planetary gear lubrication unit according to claim 2, wherein the flange and the rotating shaft are integrated with an output shaft.

4. The planetary gear lubrication unit according to claim 3, wherein:
   the race of the thrust bearing is structured to have a Z-shaped cross section with (a) the rising portion, (b) an inner radial portion extending in one direction, either left or right, from an inner radial side end of the rising portion, and (c) an outer radial portion extending in an opposite direction, either left or right, from an outer radial side end of the rising portion; and the inner radial portion is fitted to the sun gear and a predetermined gap exists between a tip end of the outer radial portion and the flange.

5. The planetary gear lubrication unit according to claim 4, wherein a cutout portion is formed at predetermined intervals in the outer radial portion of the race.

6. The planetary gear lubrication unit according to claim 5, wherein the annular groove has an inclined surface that is slanted from the flange side toward the bottom portion and a flange portion in which a pinion side protrudes radially inward.

7. The planetary gear lubrication unit according to claim 6, wherein a tip portion of the flange portion, which forms a wall surface of the annular groove on the pinion side, is arranged adjacent the outer radial side end of the race.

8. The planetary gear lubrication unit according to claim 7, wherein the planetary gear unit has a ring gear, and a support plate that supports the ring gear has, on an inner peripheral side, a boss portion that extends in the axial direction.

9. The planetary gear lubrication unit according to claim 8, wherein:
the planetary gear unit is used in a transmission which changes a speed of rotation output from a drive motor of a hybrid drive system; and
lubrication oil supplied to the rotating shaft is supplied by hydraulic pressure generated by an electric oil pump.

10. The planetary gear lubrication unit according to claim 1, wherein the flange and the rotating shaft are integrated with an output shaft.

11. The planetary gear lubrication unit according to claim 1, wherein:
the race of the thrust bearing is structured to have a Z-shaped cross section with (a) the rising portion, (b) an inner radial portion extending in one direction, either left or right, from an inner radial side end of the rising portion, and (c) an outer radial portion extending in an opposite direction, either left or right, from an outer radial side end of the rising portion; and
the inner radial portion is fitted to the sun gear and a predetermined gap exists between a tip end of the outer radial portion and the flange.

12. The planetary gear lubrication unit according to claim 11, wherein a cutout portion is formed at predetermined intervals in the outer radial portion of the race.

13. The planetary gear lubrication unit according to claim 1, wherein the annular groove has an inclined surface that is slanted from the flange side toward the bottom portion and a flange portion in which a pinion side protrudes radially inward.

14. The planetary gear lubrication unit according to claim 1, wherein a tip portion of a flange portion, which forms a wall surface of the annular groove on a pinion side, is arranged adjacent an outer radial side end of the race.

15. The planetary gear lubrication unit according to claim 1, wherein the planetary gear unit has a ring gear, and a support plate that supports the ring gear has, on an inner peripheral side, a boss portion that extends in the axial direction.

16. The planetary gear lubrication unit according to claim 1, wherein:
the planetary gear unit is used in a transmission which changes a speed of rotation output from a drive motor of a hybrid drive system; and
lubrication oil supplied to the rotating shaft is supplied by hydraulic pressure generated by an electric oil pump.

17. The planetary gear lubrication unit according to claim 13, wherein an oil pool is defined by the flange portion and the flange integrally connected with the first side plate.

18. The planetary gear lubrication unit according to claim 1, wherein the carrier is connected to the rotating shaft and the thrust bearing is fitted to a sleeve shaft of the sun gear.

19. The planetary gear lubrication unit according to claim 1, wherein the thrust bearing, and the annular groove and the communication hole in the first side plate overlap with a width of the first side plate.

20. The planetary gear lubrication unit according to claim 11, wherein the rising portion is at least one of perpendicular to the rotating shaft, convex or concave.

* * * * *